United States Patent [19]

Williams

[11] Patent Number: 5,243,849
[45] Date of Patent: Sep. 14, 1993

[54] ON-LINE CALIPER GAUGE

[75] Inventor: Paul Williams, Columbus, Ohio

[73] Assignee: Process Automation Business, Inc., Columbus, Ohio

[21] Appl. No.: 866,293

[22] Filed: Apr. 13, 1992

Related U.S. Application Data

[63] Continuation of Ser. No. 501,581, Mar. 30, 1990, abandoned.

[51] Int. Cl.$^5$ .............................................. G01B 13/04
[52] U.S. Cl. ..................................................... 73/37.7
[58] Field of Search ................ 73/37.6, 37.7; 324/229

[56] References Cited

U.S. PATENT DOCUMENTS

| | | | |
|---|---|---|---|
| 4,292,838 | 10/1981 | Larsen | 73/37.7 |
| 4,434,649 | 3/1984 | Williams | 73/37.7 |
| 4,450,404 | 5/1984 | Williams et al. | 73/37.7 |
| 4,647,855 | 3/1987 | Berglund | 73/37.7 |
| 4,912,410 | 3/1990 | Morley | 73/37.6 |

*Primary Examiner*—Tom Noland
*Assistant Examiner*—Michael Brock
*Attorney, Agent, or Firm*—Chilton, Alix & Van Kirk

[57] ABSTRACT

An air bearing gauge 10 is characterized by a flat land 30, instead of the prior art's "knife-edge" 30', so as to provide an area 32 over web 12 through which pressurized gas flows in escaping from the gas supply means 16 and the gas bearing region 24. The land 30 provides an upward scaling of the readings obtained on-line, which can correlate the reading to standard TAPPI caliper gauge measurements of sheets as are obtained off-line, in the laboratory.

2 Claims, 1 Drawing Sheet

ON-LINE CALIPER GAUGE

This is a continuation of copending application Ser. No. 07/501,581, filed on Mar. 30, 1990, now abandoned.

This application relates to improvements to on-line caliper measurements made by annular air bearing caliper gauges of the type covered by U.S. Pat. No. 4,434,649, granted to Paul Williams, the inventor of the instant application invention, and assigned to the same assignee.

BACKGROUND OF THE INVENTION

The previous invention, described in U.S. Pat. No. 4,434,649, of a caliper measurement device using an annular air bearing has been shown to have certain limitations when applied to paper webs of varying smoothness or webs which contain cockles.

The problems associated with webs of varying smoothness are not errors of mean thickness per se but are manifested in the inability to build large rolls of paper with uniform cross direction density and diameter. The effective thickness of the paper when stacked or rolled is a function not only of thickness but also the degree to which the surface irregularities nest together. Therefore a roll of rough surfaced paper wound with fixed windup tension will have a greater diameter and appear more dense than a smooth surfaced sheet of the same mean thickness.

Cockled paper has small puckered areas usually caused by uneven drying. These areas cause the small area peak to peak excursions of the sheet surfaces about the plane of the sheet to exceed the thickness of the actual sheet cross section. This introduces an error into the caliper measurement unless the forces acting on the sheet can overcome the forces in the sheet thereby flattening the cockles in the area of measurement.

The annular air bearing caliper described in U.S. Pat. No. 4,434,649 measures the mean thickness of a sheet or web of paper. This will give optimum results when building a reel of paper only when the web is uniformly smooth in the cross machine direction.

BRIEF DESCRIPTION OF THE INVENTION

By experimentation, I have observed that the effect of roll building density caused by sheet roughness may typically be expressed by measuring the delta or incremental roughness about the mean sheet roughness and then scaling this value, as measured by a "Sheffield" air leak smoothness testing device, by 0.1, which yields an approximation of the apparent thickness increase observed when measuring stacked sheets using a standard TAPPI caliper gauge "off-line".

The Sheffield air leak paper smoothness gauge is Bendix Part No. 60080029 and it is configured for use with a three-column Bendix Modular Precisionaire. Both are widely used and are obtainable from The Bendix Corporation, Automation and Measurement Division, 721 Springfield Street, Post Office Box 1127, Dayton, Ohio 45401. Procedures for their use are described in Bendix Manual No. 60112954 and TAPPI Provisional Method-1982 T538pm-82. The measurement of stacked sheets using a standard TAPPI caliper gauge is described in T411om-84, an official TAPPI test method revised in 1984. A variety of manufacturers supply equipment and materials for use in this procedure and their names are available from the TAPPI Information Resources Administrator. Examples of such suppliers are: Testing Machines Inc. of 400 Bayview Avenue, Amityville, N.Y. 11701 and Emveco, Inc., Post Office Box 16, Newberg, Oreg. 97132.

It has been discovered that the 0.1 upward scaling of the delta roughness approximation can be built into the measurement response of an on-line, annular air bearing caliper gauge of the type previously disclosed in U.S. Pat. No. 4,434,649. This has been accomplished by replacing the "knife-edge" between the vertical annular wall of the disk shaped counterbore of the surface follower body and its outer perimeter with an annular flat land.

Thus, in performing the measurement of a traveling web or the like, the gauge's surface follower body with its gas confining wall, pressurized gas supply means with an outer periphery for pressurizing a gas bearing region that is contiguous to the web surface and bounded by the orthographic projection of the periphery on the web surface, is provided with: rather than a "knife-edge", a surrounding flat land of from 0.005 inches (0.0127 cm.) to 0.120 inches (0.305 cm.), depending on the web surface character. For example, in the case of newsprint, the value is 0.080 inches (0.203 cm.) when the pressurized gas supply region is nominally 2 inches (5.08 cm.) in diameter. Simple calibration experimentation in this approximate range will determine the best correlation with a standard TAPPI caliper gauge on the stacked sheets.

DETAILED DESCRIPTION OF THE PREFERRED EMBODIMENT

Figure 1:
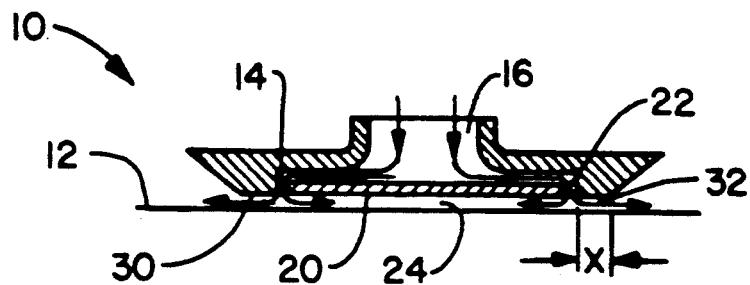
FIG. 1 is a side elevational cross-sectional schematic diagram of the air bearing caliper gauge surface follower body in floating position over a traveling web whose thickness is being measured.

The numeral 10 generally designates the air bearing caliper gauge surface follower body constructed according to the principals of the invention. The body 10 is for use in an apparatus environment fully understood in the art and illustrated in Applicant's U.S. Pat. No. 4,434,649, assigned to the assignee of the present invention.

The surface follower body 10 floats above a traveling web 12 which is typically a web of paper undergoing the final stages of manufacture on a paper machine. The body 10 has a gas confining wall 14 in gas conveying communication with a pressurized gas supply means schematically shown as conduit 16.

Gas flows, as shown by arrows, through pressurized gas supply conduit 16, radially outwardly to the gas confining wall 14 along the top of a target disc member 20, and downwardly through continuous annular slot 22 formed by disc 20 and the gas confining wall 14.

The flow of pressurized gas radially inwardly between the surface of web 12 and the disc 20 forms a gas bearing region 24 that is contiguous to the web surface and is bounded at the web surface by the orthographic projection of the pressurized gas supply means or conduit 16 periphery as defined by the gas confining wall 14.

Figure 3:
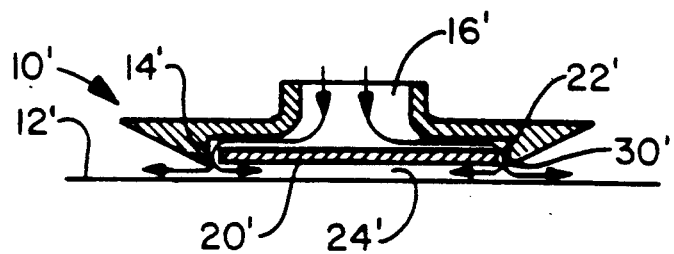
FIG. 3 is a view similar to FIG. 1 of a prior art body, for comparison.

The structure described in detail, so far, is found in the prior art, U.S. Pat. No. 4,434,649, as illustrated for example in FIG. 3 with comparable numbers primed (') for comparison ease. Alternatively, as in the case of my earlier patent, the pressurized gas supply means 16 may comprise a multiplicity of spaced holes instead of continuous annular slot 22.

Figure 2:
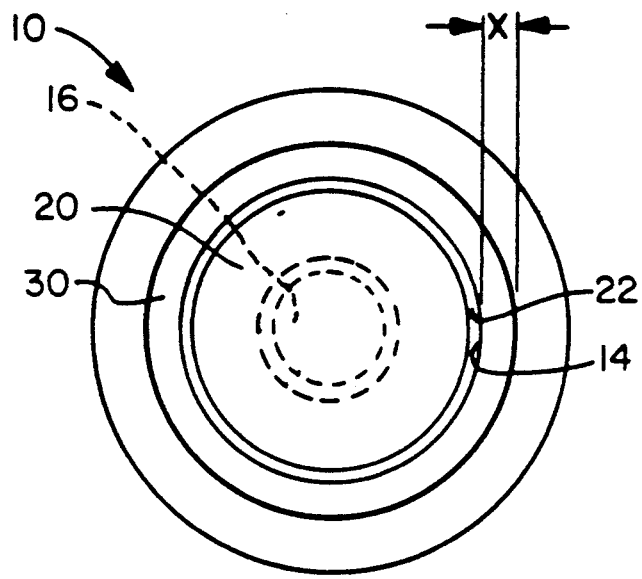
FIG. 2 is a bottom schematic view of the body of FIG. 1.

The novel combination of FIGS. 1 and 2 which gives the inventive results includes a flat land 30 on the surface follower body 10 surrounding the periphery of the pressurized gas supply means or conduit 16 as defined by the gas confining wall 14.

The flat land 30 provides an annular area 32, instead of the prior art "knife-edge" 30', radially outwardly from the gas bearing region 24 bounded at the web surface by the orthographic projection of the pressurized gas supply means 16 and gas confining wall 14. The annular area of the land 30 and the surface portion of web 12 directly facing it, both of which extend radially outwardly a distance "x" from the region 24, causes the incremental or delta rougheners readings that otherwise would be obtained to be scaled upwardly, typically by a value of 0.1. This creates an on-line air bearing caliper gauge correlation with a standard TAPPI caliper gauge measurement for comparison.

The value of "x" for the disclosed embodiment has been found to be from 0.005 inches (0.0127 cm.) to 0.120 inches (0.305 cm.), depending on the surface characteristics of web 12. In the case of a newsprint web 12, the land is typically 0.080 inches (0.203 cm.) for an outer periphery of the gas supply means 16, i.e., the gas confining wall 14, of 2 inches (5.08 cm.) in diameter in this embodiment.

Thus, by converting the "knife-edge" 30' of the prior art to a flat land 30 of radial extent "x", Applicant has provided a new proportion to obtain an on-line reading which correlates with standard TAPPI caliper gauge measurements of sheets as are obtained off-line, in the laboratory.

I claim:

1. An annular air bearing caliper gauge of the type used for performing a thickness measurement of a traveling web, said gauge including a surface follower body having a gas confining wall and a pressurized gas supply means with an outer periphery for pressurizing a gas bearing region that is contiguous to the web surface and bounded at the web surface by the orthographic projection of the periphery on the web surface, said gauge being characterized by an outer periphery of the pressurized gas supply means which is nominally 2 inches (5.08 cm.) in diameter and a means for correlating laboratory measurements including a flat land surrounding the periphery so as to provide an area of the web over which pressurized gas flows in escaping from the gas supply means and the gas bearing region, which area extends outwardly a radial distance X from the orthographic projection of the periphery, where X is in the range of from 0.005 inches (0.0127 cm.) to 0.120 inches (0.305 cm.), depending on the surface character of the paper being correlated to the laboratory measurements.

2. The air bearing caliper of claim 1 in which the land is approximately 0.080 inches (0.203 cm.).

* * * * *